United States Patent
Liu et al.

(10) Patent No.: US 10,910,829 B2
(45) Date of Patent: Feb. 2, 2021

(54) INTERFACE CIRCUITS TO MONITOR AND PREVENT OVERSTRESS DAMAGE

(71) Applicant: MEDIATEK INC., Hsin-Chu (TW)

(72) Inventors: Shou-En Liu, Hsinchu (TW);
Hsien-Sheng Huang, Hsinchu (TW);
Yu-Hsuan Lin, Hsinchu (TW);
Ming-Tsung Lin, Zhudong Township, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 701 days.

(21) Appl. No.: 15/722,705

(22) Filed: Oct. 2, 2017

(65) Prior Publication Data
US 2018/0102639 A1    Apr. 12, 2018

Related U.S. Application Data

(60) Provisional application No. 62/502,835, filed on May 8, 2017, provisional application No. 62/404,778, filed on Oct. 6, 2016.

(51) Int. Cl.
*H02H 9/00* (2006.01)
*H02H 9/04* (2006.01)

(52) U.S. Cl.
CPC ............ *H02H 9/04* (2013.01); *H02H 9/042* (2013.01)

(58) Field of Classification Search
None
See application file for complete search history.

(56) References Cited

U.S. PATENT DOCUMENTS

| | | | | |
|---|---|---|---|---|
| 4,876,626 A | * | 10/1989 | Kaczmarek | H01T 1/14 361/119 |
| 5,748,093 A | * | 5/1998 | Swanson | H02H 9/042 340/635 |
| 5,923,517 A | * | 7/1999 | Murphy | H01R 13/6666 340/659 |
| 7,402,892 B1 | * | 7/2008 | Glaser | H04Q 1/146 257/173 |
| 7,522,395 B1 | | 4/2009 | Tien et al. | |
| 2010/0254051 A1 | | 10/2010 | Jeon et al. | |
| 2016/0285255 A1 | | 9/2016 | O'Donnell et al. | |

FOREIGN PATENT DOCUMENTS

CN        103185845 A       7/2013

* cited by examiner

*Primary Examiner* — Stephen W Jackson
(74) *Attorney, Agent, or Firm* — McClure, Qualey & Rodack, LLP

(57) ABSTRACT

An interface circuit of an electronic device includes one or more pins, an internal circuit, an over-voltage protection circuit and a monitoring circuit. The pins are selectively connected to an external circuit. The over-voltage protection circuit is coupled between the internal circuit and at least one pin to prevent the internal circuit from being damaged by a voltage spike or a current surge received at the pin. The monitoring circuit is configured to monitor one or more electrical characteristics of at least one critical component in the internal circuit or the over-voltage protection circuit by monitoring the value of at least one parameter related to the electrical characteristics of the critical component. When the value of the parameter is outside of a safety range, the monitoring circuit outputs a warning signal.

24 Claims, 16 Drawing Sheets

INTERFACE CIRCUITS TO MONITOR AND PREVENT OVERSTRESS DAMAGE

CROSS REFERENCE TO RELATED APPLICATIONS

This application claims the benefit of U.S. Provisional Application No. 62/404,778 filed 2016 Oct. 6 and entitled "Type-C interface reliability concerns of electrical overstress and design for mitigation" and U.S. Provisional Application No. 62/502,835 filed 2017 May 8 and entitled "Methods and circuits to monitor and protect overstress damage". The entire contents of which are hereby incorporated by reference.

BACKGROUND OF THE INVENTION

Field of the Invention

The invention relates to an interface circuit, and more particularly to an interface circuit with an over-voltage protection circuit for preventing the interface circuit from being damaged by electrical overstress.

Description of the Related Art

It is well known that electronic circuitry must be protected from transient voltage and current conditions which exceed the capacity of the circuitry. Such electrical transients can damage circuitry and can cause errors in operation. Protection from electrical overstress disturbances is particularly required for modern electronic communication and control systems whose solid-state microelectronic components are highly sensitive to excessive currents and voltages.

Various devices and methods are known for providing protection from limited electrical overstresses. At the most basic level, it is common to shield electronic devices from electromagnetic transients with grounded wire screen enclosures. Such shielding, however, does not protect electronic devices from transient electrical overstress disturbances which penetrate into shielded circuits via connecting conductor lines.

To protect circuitry from such transient overstress disturbances, and to provide further protection to the critical components in the circuitry which may suffer from electrical overstress, methods and circuits to monitor and prevent overstress damage are proposed.

BRIEF SUMMARY OF THE INVENTION

Interface circuits are provided. An exemplary embodiment of an interface circuit of an electronic device comprises one or more pins, an internal circuit, an over-voltage protection circuit and a monitoring circuit. The pins are selectively connected to an external circuit. The over-voltage protection circuit is coupled between the internal circuit and at least one pin to prevent the internal circuit from being damaged by a voltage spike or a current surge received at the pin. The monitoring circuit is configured to monitor one or more electrical characteristics of at least one critical component in the internal circuit or the over-voltage protection circuit by monitoring the value of at least one parameter related to the electrical characteristics of the critical component. When the value of the parameter is outside of a safety range, the monitoring circuit outputs a warning signal.

Another exemplary embodiment of an interface circuit of an electronic device comprises one or more pins, an internal circuit, an over-voltage protection circuit and a monitoring circuit. The pins are selectively connected to an external circuit. The over-voltage protection circuit is coupled between the internal circuit and at least one pin to prevent the internal circuit from being damaged by a voltage spike or a current surge received at the pin. The monitoring circuit is configured to monitor one or more electrical characteristics of at least one critical component in the over-voltage protection circuit by monitoring the value of at least one parameter related to the electrical characteristics of the critical component. When the value of the parameter is outside of a safety range, the monitoring circuit outputs a warning signal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The electrical overstress (EOS) issue has recently become an issue of concern when it comes to electronic devices with input/output interfaces and/or I/O ports that can be selectively connected to external devices. This is the case because, in recent years, there has been an increase in the voltage provided by one or more pins of an external connector or external plug in order to provide more advanced functions.

For example, the voltage provided by one or more power pins of an external connector or plug has been greatly increased in order to provide a fast-charge function. Problems may arise when, in trying to connect the external connector or external plug to the internal I/O interface or the internal I/O port of the electronic device, the user erroneously connects the external connector or external plug that provides high voltage to the wrong pins of the electronic device. If the pin that has been erroneously connected to the power-supply pin cannot sustain such high voltage, the circuit components coupled to the erroneously connected pin will become damaged by transient electrical overstresses.

Figure 1:
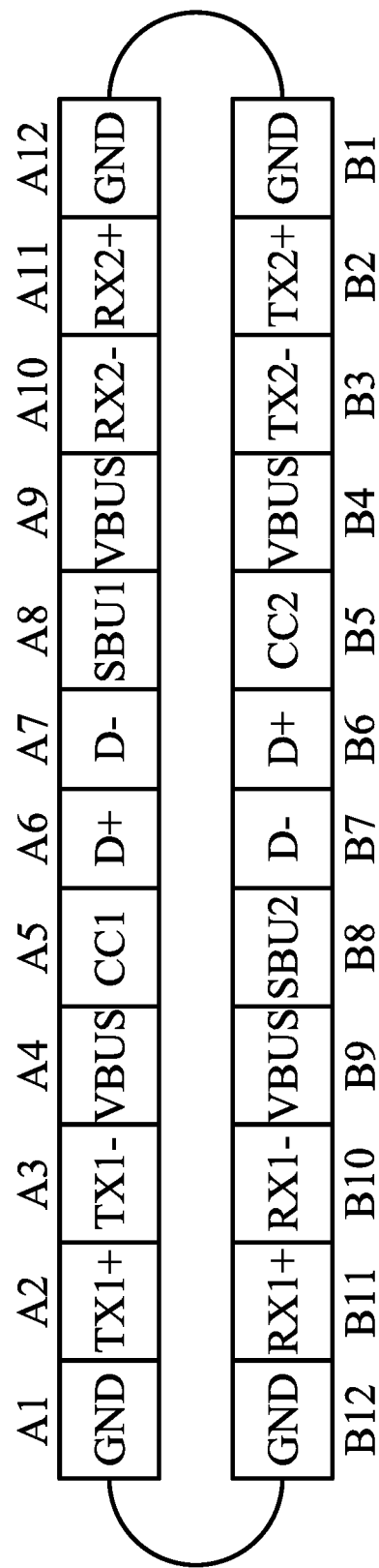
FIG. 1 shows an exemplary pin arrangement of a type-C USB interface.
Figure 2:
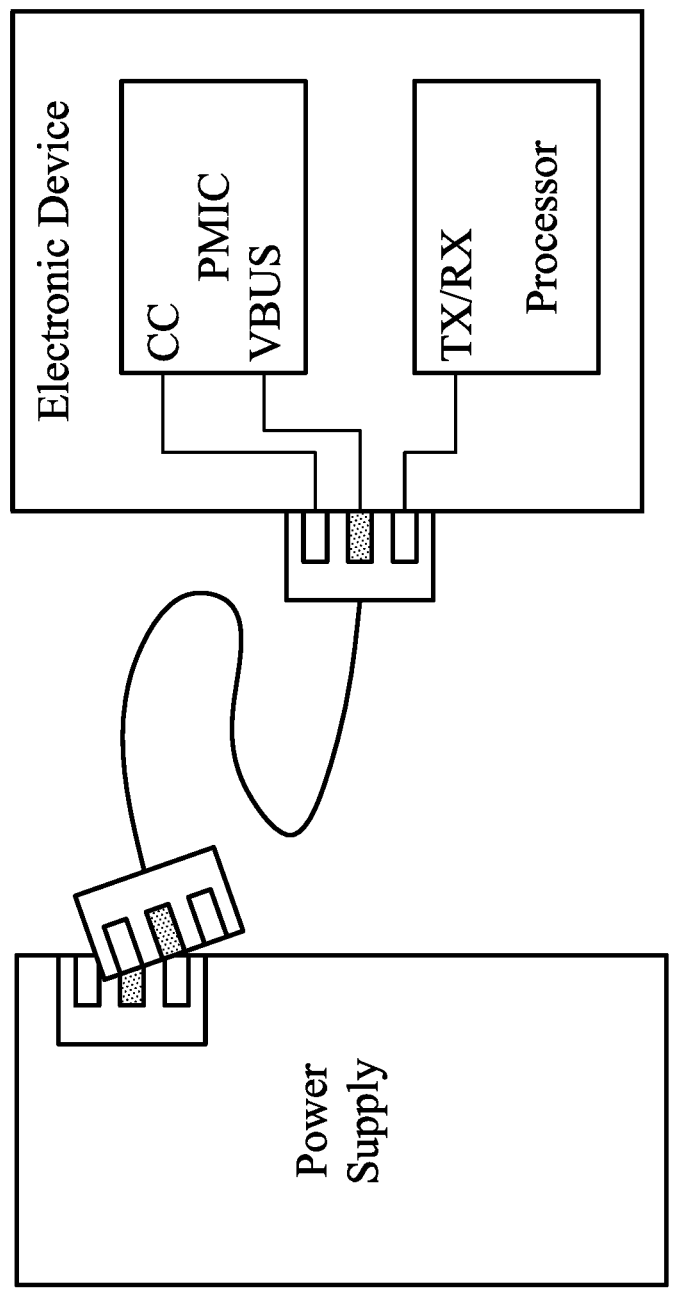
FIG. 2 shows an exemplary situation when the VBus pin of a USB connector is erroneously connected to the adjacent CC pin.

FIG. 1 shows an exemplary pin arrangement of a type-C USB interface. Taking the type-C USB interface as an example, the VBus pin of a USB connector is utilized to input/output a high voltage at a level around 12V. However, when the VBus pin is erroneously connected to the adjacent pin, such as the CC pin, in the manner illustrated in FIG. 2, the circuit components coupled to the CC pin will be damaged by the transient electrical overstresses because the level (for example, about 12V) of the high voltage provided by the VBus pin already exceeds the maximum rated voltage (for example, about 5V) of the CC pin. The rated voltage of each pin is usually defined in the corresponding data sheet or specification of the corresponding electronic product.

To solve this problem, novel circuit designs to prevent circuitry from such transient overstress disturbances are provided.

Figure 3:
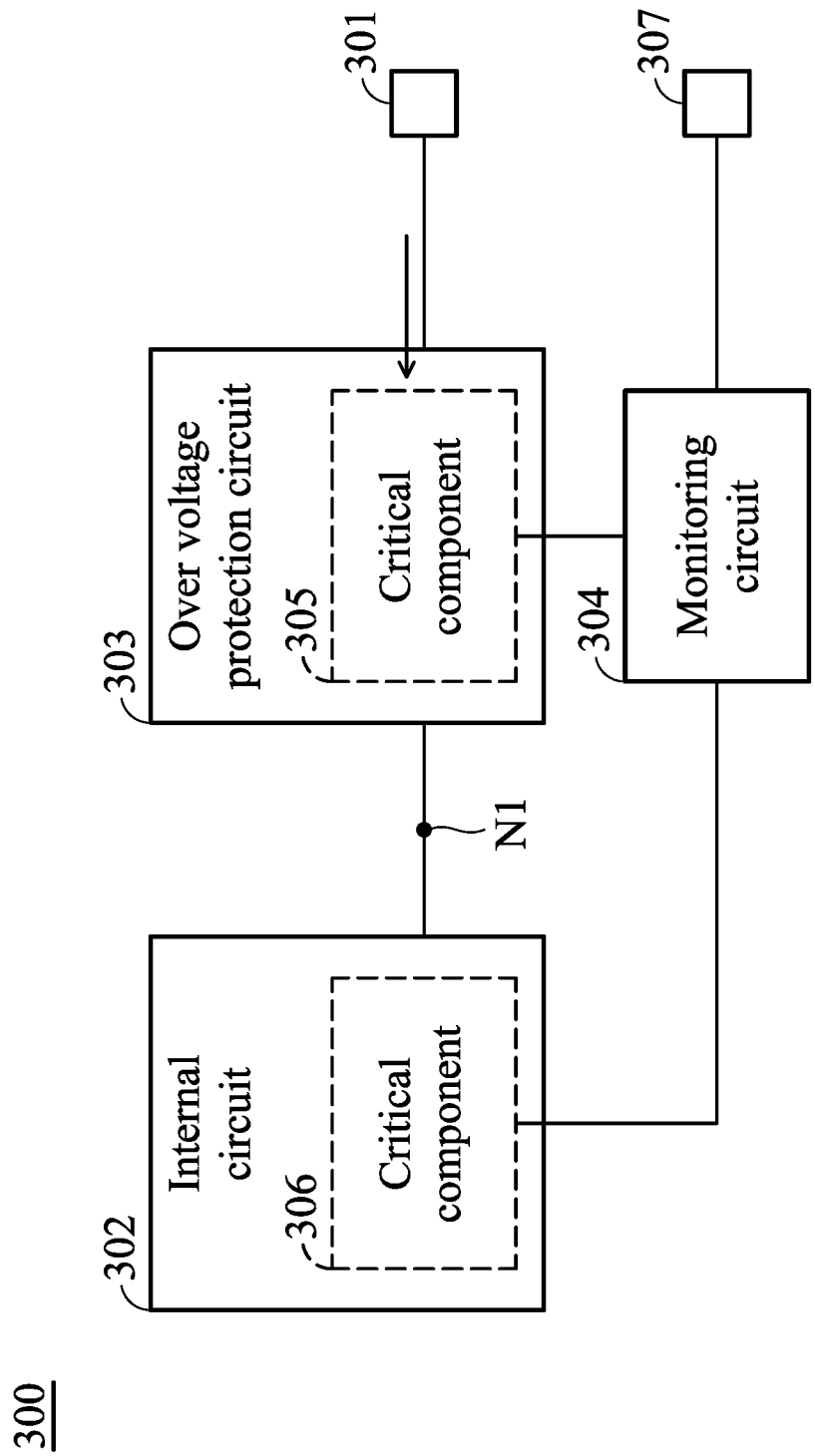
FIG. 3 shows an exemplary block diagram of an interface circuit of an electronic device according to an embodiment of the invention.

FIG. 3 shows an exemplary block diagram of an interface circuit of an electronic device according to an embodiment of the invention. In the embodiments of the invention, the electronic device may be an in-vehicle electronic device or a portable electronic device, such as a notebook, a cellular phone, a portable gaming device, a portable multimedia player, a Global Positioning System (GPS), a receiver, or others.

The interface circuit 300 may comprise one or more pins, (shown as pin 301 for simplicity), an internal circuit 302, an over-voltage protection circuit 303 and a monitoring circuit 304. The pins are configured to be selectively connected to an external circuit. For example, when the interface circuit 300 is a USB interface, the pins are configured to be selectively connected to the corresponding pins of a USB connector. The internal circuit 302 is configured to provide the main interfacing function of the interface circuit 300. The over-voltage protection circuit 303 is coupled between the internal circuit 302 and the pin 301, and is configured to control voltage at a predetermined node N1, so as to prevent the internal circuit 302 from being damaged by a voltage spike or a current surge received at the pin 301.

Note that in the embodiments of the invention, the over-voltage protection circuit 303 and monitoring circuit 304 may be implemented for a pin which may have the possibility to be erroneously connected to, or to come into contact with, the wrong pin that provides a voltage higher than the maximum rated voltage of that pin. However, the invention is not limited thereto. The over-voltage protection circuit 303 and monitoring circuit 304 may be also be implemented in any circuit that the designer would like to protect.

According to an embodiment of the invention, the over-voltage protection circuit 303 controls the voltage at the predetermined node N1 to adequately fall within a predetermined range, so as to prevent the internal circuit 302 from being damaged by a extreme high voltage received at the pin 301. Besides the electrical overstress protection, in the embodiments of the invention, a further protection on the critical components in the interface circuit 300 is also provided by the monitoring circuit 304.

According to an embodiment of the invention, the monitoring circuit 304 is configured to monitor one or more electrical characteristics of at least one critical component in the over-voltage protection circuit (for example, the critical component 305) or at least one critical component in the internal circuit (for example, the critical component 306), and determine whether the critical component is about to break down. To be more specific, when an electric component keeps suffering from high voltage, some electrical characteristics thereof will be changed. By monitoring the electrical characteristics or the change in the electrical characteristic, the monitoring circuit 304 may determine whether the electric component is about to break down. When the monitoring circuit 304 determines that the critical component is about to break down, the monitoring circuit 304 may generate a warning signal and output the warning signal via an output pin, such as output pin 307.

When a processor (not shown) of the electronic device receives the warning signal, the processor may show a notification message via a screen or generate a notification sound via a loud speaker of the electronic device, so as to notify the user that he or she is suggested to bring the electronic device to the maintenance center to have a further check on the internal circuit components of the electronic device. When necessary, the maintenance center may repair or replace the circuit components of the electronic device. This would be very helpful to avoid the undesired operation error to occur due to the electric component break down.

According to an embodiment of the invention, the monitoring circuit 304 may monitor the electrical characteristics of the critical component by detecting the value of at least one parameter or factor related to the electrical characteristics of the critical component. When a detected value of the parameter or factor is outside of a safety range, the monitoring circuit 304 outputs the warning signal. The safety range may be flexibly designed according to the attribute of electrical characteristics of the corresponding critical component.

Figure 4:
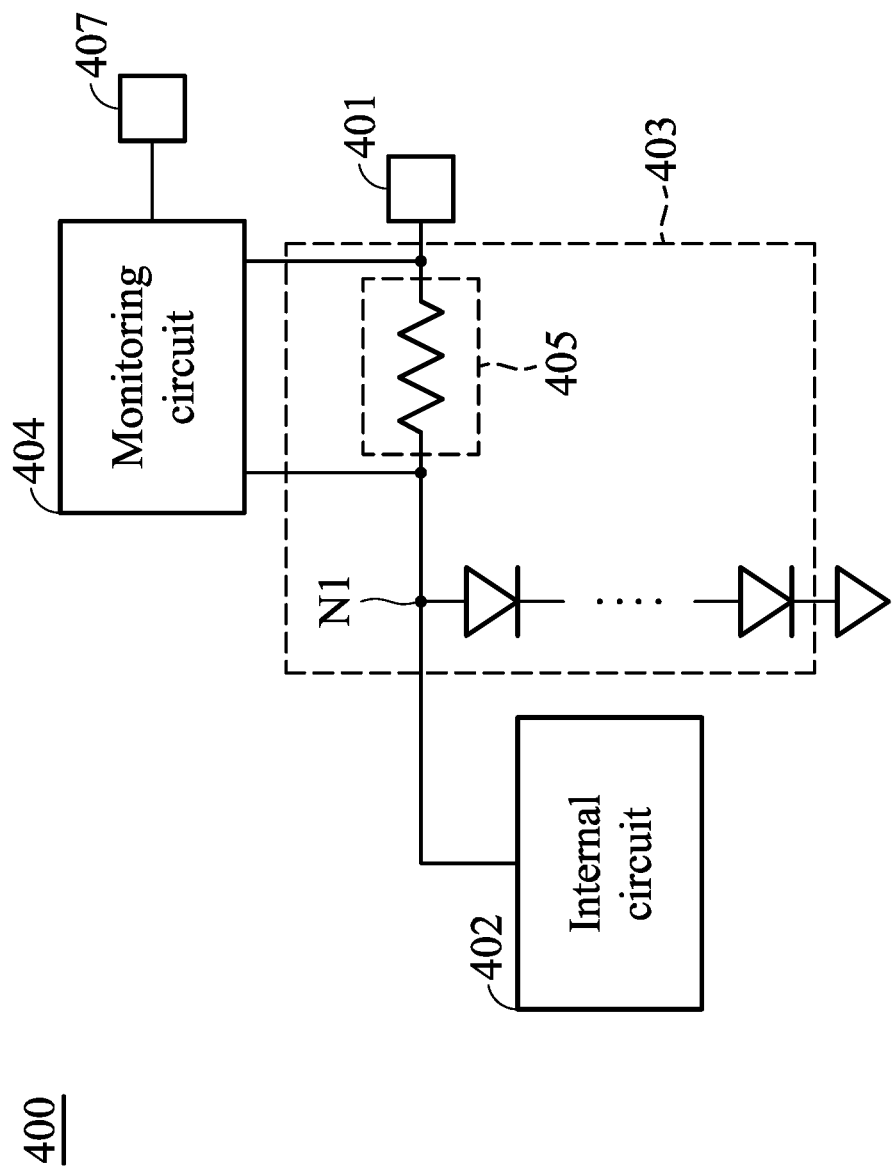
FIG. 4 shows an exemplary block diagram of an interface circuit of an electronic device according to an embodiment in a first aspect of the invention.

FIG. 4 shows an exemplary block diagram of an interface circuit of an electronic device according to an embodiment in a first aspect of the invention. The interface circuit 400 may comprise at least one pin 401 configured to be selectively connected to an external circuit, an internal circuit 402, an over-voltage protection circuit 403 and a monitoring circuit 404. The internal circuit 402 is configured to provide a main interfacing function of the interface circuit 400. The over-voltage protection circuit 403 is coupled between the internal circuit 402 and the pin 401, and is configured to control voltage at a predetermined node N1 to prevent the internal circuit 402 from being damaged by a voltage spike or a current surge received at the pin 401.

According to an embodiment of the invention, the over-voltage protection circuit 403 may comprise at least one resistor (for example, the resistor 405 coupled between the at least one pin 401 and the predetermined node N1) and one or more diodes coupled in serial. In this embodiment, the critical component is the resistor 405 coupled to the predetermined node N1, and the electrical characteristics of the critical component to be monitored by the monitoring circuit 404 is a resistance of the resistor 405.

When a resistor keeps suffering from high voltage, the resistance thereof will be increased, and the resistor may finally break down. In order to prevent the electronic device 400 and prevent the critical component from breaking down, the monitoring circuit 404 monitors the resistance of the resistor 405 and output a warning signal via the output pin 407 before the resistor 405 breaks down.

According to an embodiment of the invention, the monitoring circuit 404 may monitor the resistance of the resistor 405 by detecting a voltage at the predetermined node N1 or a voltage difference between two terminals of the resistor 405, which is an important parameter or factor related to the resistance of the resistor 405. For example, the monitoring circuit 404 monitors the voltage at the predetermined node N1 or a voltage difference between two terminals of the resistor 405 and compares the voltage or the voltage difference with a reference voltage to determine whether the voltage or the voltage difference is outside of a safety range. When the voltage or the voltage difference is determined outside of a safety range, the monitoring circuit 404 outputs a warning signal via the output pin 407. Note that the safety range may be flexibly designed according to the corresponding electrical characteristics to be monitored and may have a margin so that the critical component will not break down right after the voltage or the voltage difference is detected outside of the safety range.

Figure 5:
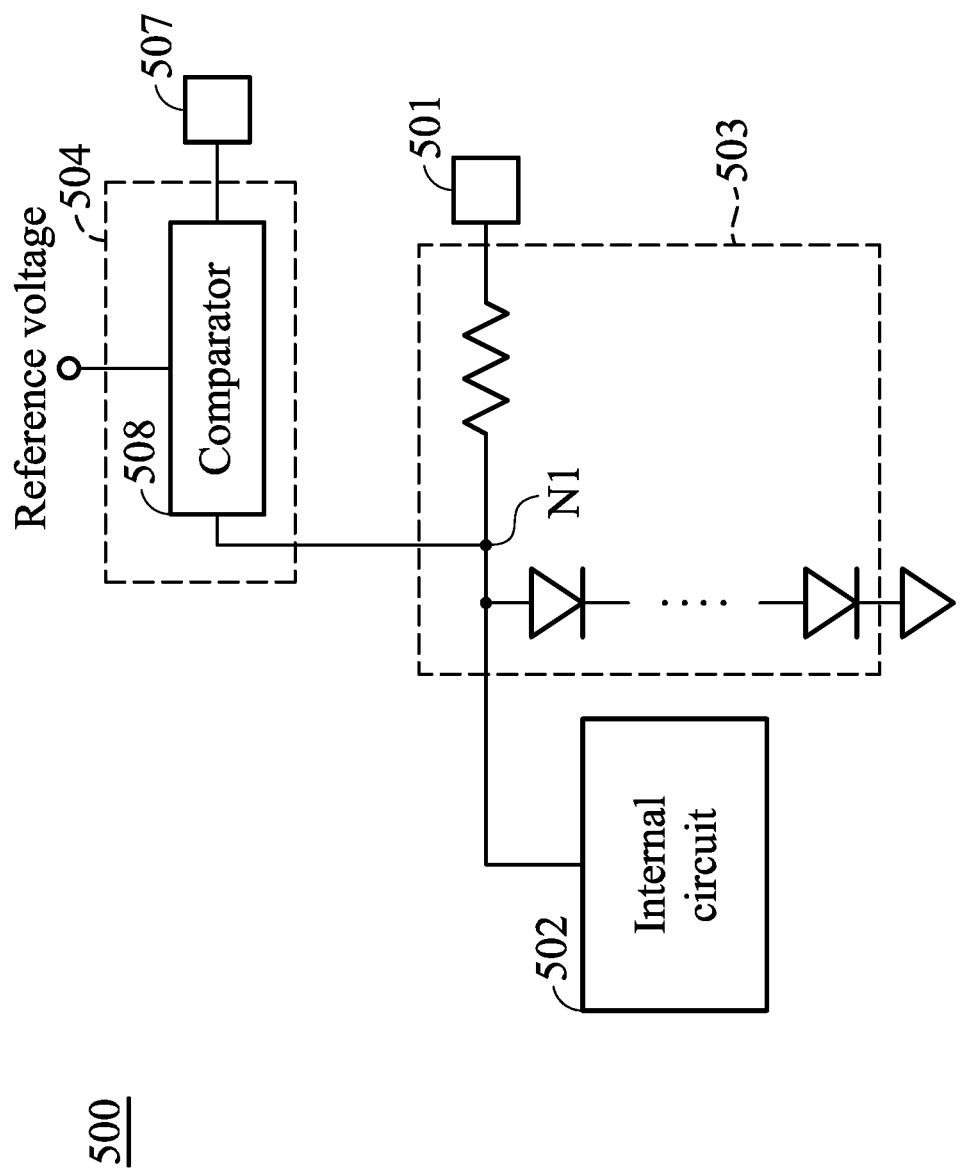
FIG. 5 shows an exemplary circuit diagram of an interface circuit of an electronic device according to a first embodiment in the first aspect of the invention.

FIG. 5 shows an exemplary circuit diagram of an interface circuit of an electronic device according to a first embodiment in the first aspect of the invention. The interface circuit 500 may comprise at least one pin 501 configured to be selectively connected to an external circuit, an internal circuit 502, an over-voltage protection circuit 503 and a monitoring circuit 504. The internal circuit 502 is configured to provide a main interfacing function of the interface circuit 500. The over-voltage protection circuit 503 is coupled between the internal circuit 502 and the pin 501, and is configured to control voltage at a predetermined node N1 to prevent the internal circuit 502 from being damaged by a voltage spike or a current surge received at the pin 501.

In this embodiment, the monitoring circuit 504 may comprise a comparator 508. The comparator 508 may have a first input terminal coupled to the predetermined node N1, a second input terminal receiving a reference voltage, and an output terminal coupled to the output pin 507. The comparator 508 compares the voltage at the predetermined node N1 with the reference voltage to determine whether the voltage is outside of a safety range. For example, when the voltage is lower than the reference voltage, the comparator 508 may output a logical high signal as a warning signal via the output pin 507 to warn the user.

Note that it is well known in the art that there are a variety of different designs for the comparator circuit. Therefore, the detailed circuit diagram of the comparator 508 is omitted here for brevity.

Figure 6A:
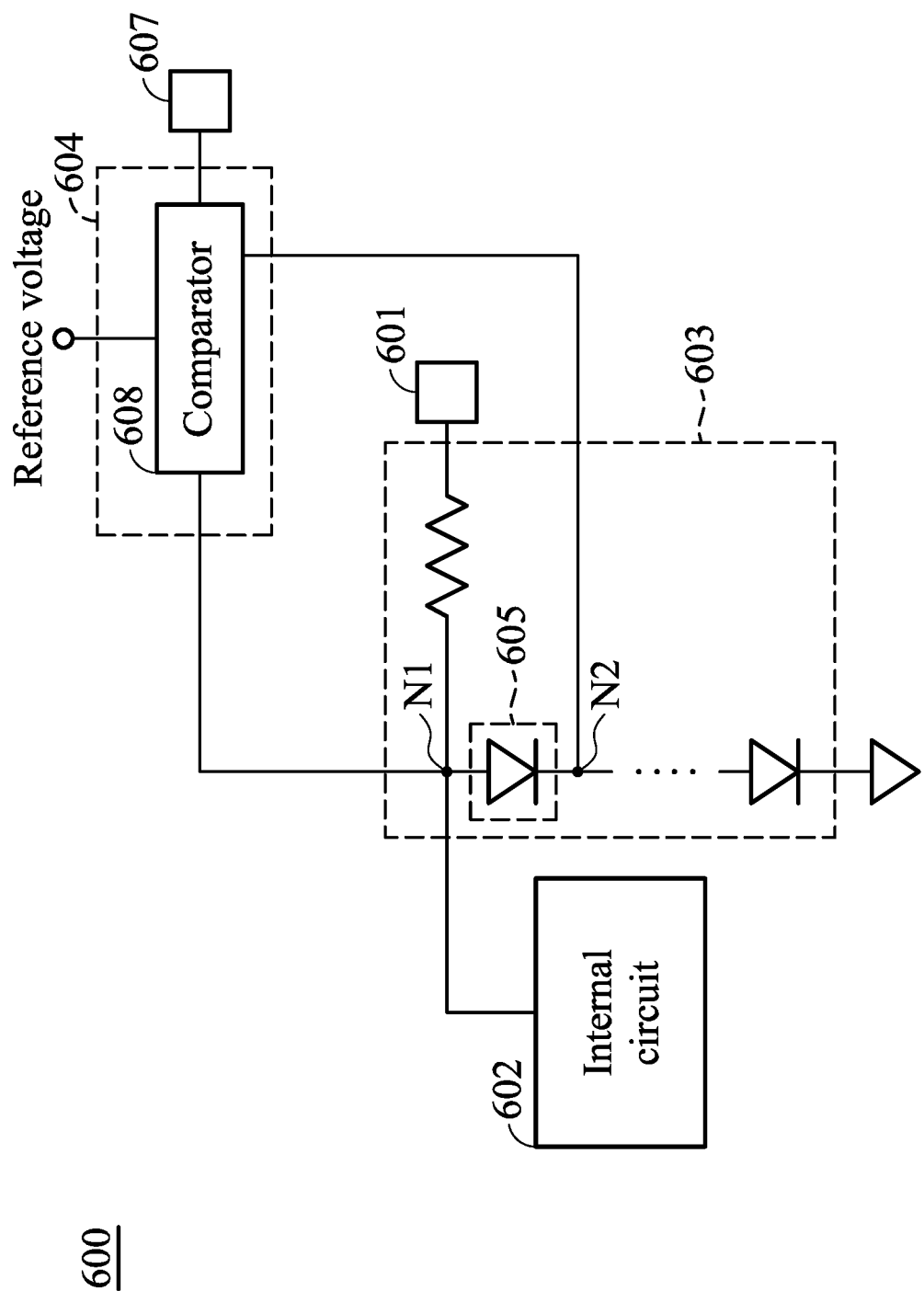
FIG. 6A shows an exemplary circuit diagram of an interface circuit of an electronic device according to a second embodiment in the first aspect of the invention.

FIG. 6A shows an exemplary circuit diagram of an interface circuit of an electronic device according to a second embodiment in the first aspect of the invention. The interface circuit 600 may comprise at least one pin 601 configured to be selectively connected to an external circuit, an internal circuit 602, an over-voltage protection circuit 603 and a monitoring circuit 604. The internal circuit 602 is configured to provide a main interfacing function of the interface circuit 600. The over-voltage protection circuit 603 is coupled between the internal circuit 602 and the pin 601, and is configured to control voltage at a predetermined node N1 to prevent the internal circuit 602 from being damaged by a voltage spike or a current surge received at the pin 601.

In this embodiment, the critical component is one or more diodes (for example, the diode 605) coupled to the predetermined node N1, and the electrical characteristics of the critical component to be monitored by the monitoring circuit 604 may be a cross-terminal voltage of the diodes (for example, diode 605).

The monitoring circuit 604 may comprise a comparator 608. The comparator 608 compares the cross-terminal voltage of the diodes (or the voltage difference between two terminals of one or more diodes) with the reference voltage to determine whether the cross-terminal voltage (or the voltage difference) is outside of a safety range. For example, when the cross-terminal voltage (or the voltage difference) is higher than the reference voltage, the comparator 608 may output a logical high signal as a warning signal via the output pin 607 to warn the user.

Figure 6B:
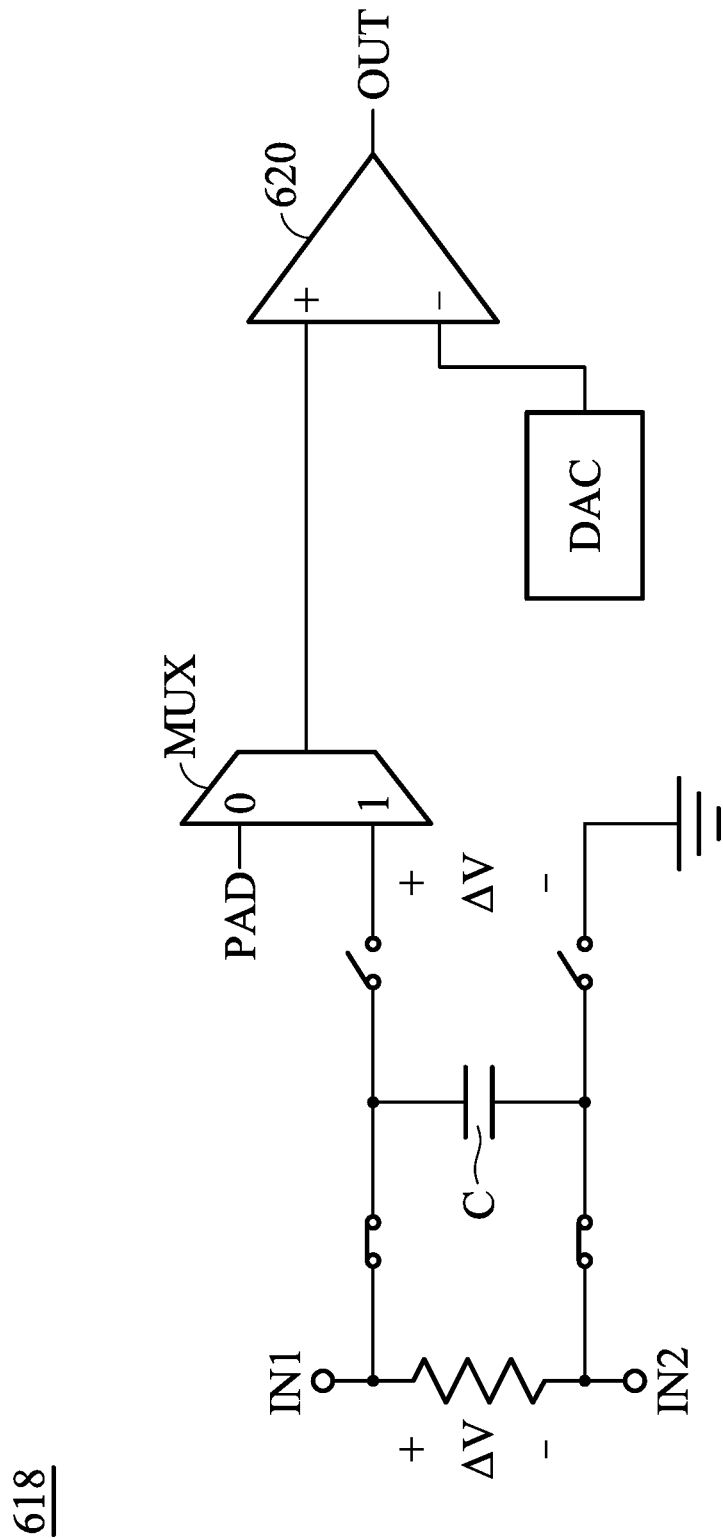
FIG. 6B shows an exemplary circuit diagram of a multi-function voltage detector according to an embodiment of the invention.
Figure 6C:
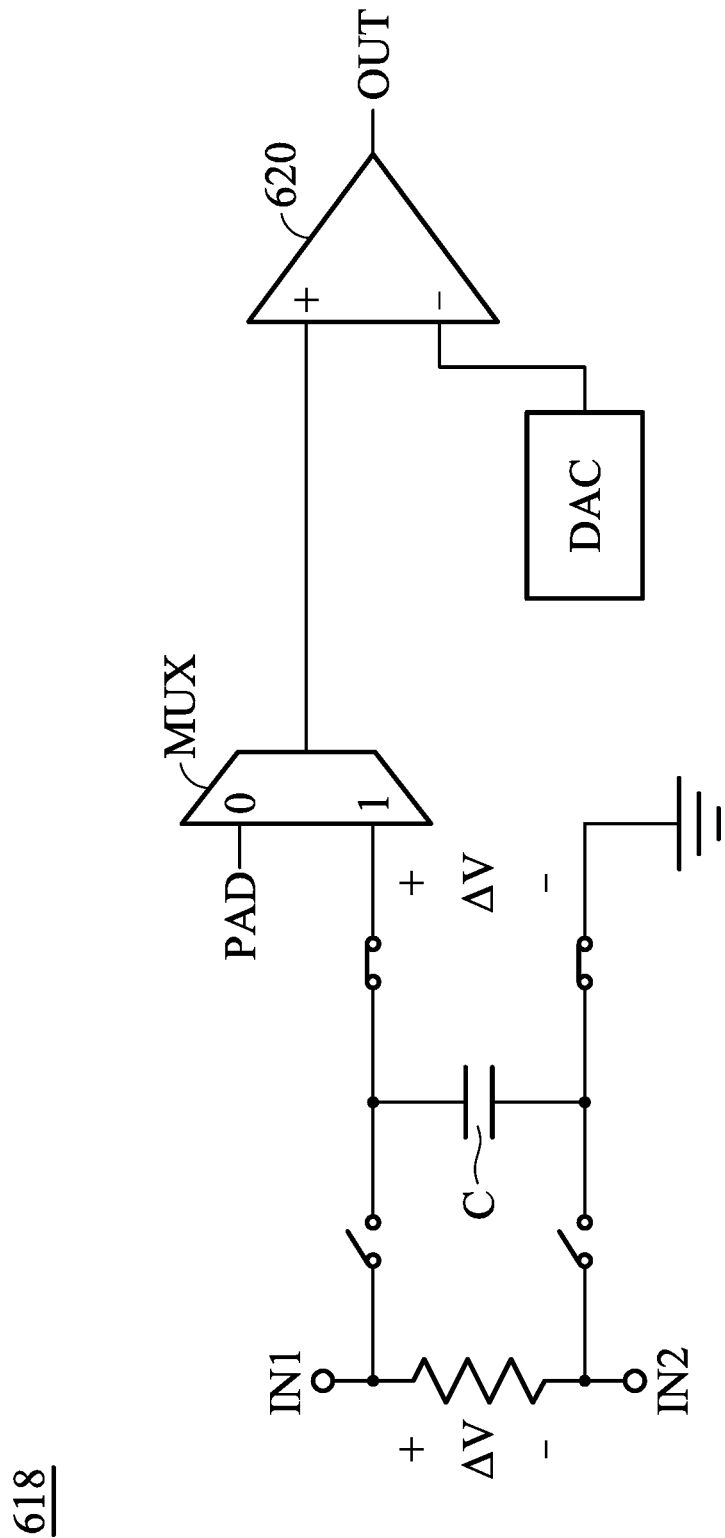
FIG. 6C shows an exemplary circuit diagram of a multi-function voltage detector according to an embodiment of the invention.

FIG. 6B shows an exemplary circuit diagram of a multi-function voltage detector for implementing the monitoring circuit according to an embodiment of the invention. The multi-function voltage detector 618 may be a portion of the monitoring circuit 604. The multiplexer MUX may be a multi-function voltage source selector for selecting the input voltage source. Referring to the embodiment shown in FIG. 6A, when a voltage difference detecting function is required, the multiplexer MUX may output the voltage difference $\Delta V$. In the embodiment shown in FIG. 6A, the first input terminal IN1 may be coupled to the predetermined node N1 and the second input terminal IN2 may be coupled to the node N2. FIG. 6B and FIG. 6C show a voltage sampling process of the multi-function voltage detector in two steps. In step 1, as shown in FIG. 6B, the voltage difference $\Delta V$ between nodes N1 and N2 are stored in the capacitor C. In step 2, as shown in FIG. 6C, the voltage difference $\Delta V$ is provided to one terminal of the multiplexer MUX.

When the voltage difference detecting function is required, the multiplexer MUX output the voltage difference $\Delta V$ to the input terminal of the comparator 620. The comparator 620 compares the multiplexer MUX output (that is, the voltage difference $\Delta V$) with a digital to analog converter (DAC) output and generates a comparison result. In this manner, the comparison result may be provided as a digital code. The processor (not shown) of the electronic device may determine whether the cross-terminal voltage (or the voltage difference $\Delta V$) is outside of a safety range according to the comparison result.

Note that in the embodiment as shown in FIG. 6A, the function of the comparator 608 in the monitoring circuit 604 may be implemented by the multi-function voltage detector 618 as shown FIG. 6B and FIG. 6C accompanied by the processor of the electronic device.

On the other hand, when an over-voltage detecting function is required (for example, it is required in the embodiments of the second aspect of the invention as shown in FIG. 7-11, which will be discussed in the following paragraphs), the multi-function voltage detector 618 may act as an over-voltage detector. Another input terminal PAD may be coupled to the I/O pin which may receive a voltage spike or a current surge (e.g. the pin 801 as shown in FIG. 8). When the multi-function voltage detector 618 is acting as an over-voltage detector, the multiplexer MUX may output the voltage received at the I/O pin to the input terminal of the comparator 620. The comparator 620 compares the multiplexer MUX output (that is, the voltage received at the I/O pin) with the DAC output and generates a comparison result. In this manner, the comparison result may be provided as a digital code. The processor may further determine whether the level of the voltage received at the I/O pin exceeds a predetermined threshold according to the comparison result.

Note that in the embodiments of the invention, operations of the switches and the multiplexer MUX may be controlled by the processor, and the DAC output may be adequately designed.

Figure 7:
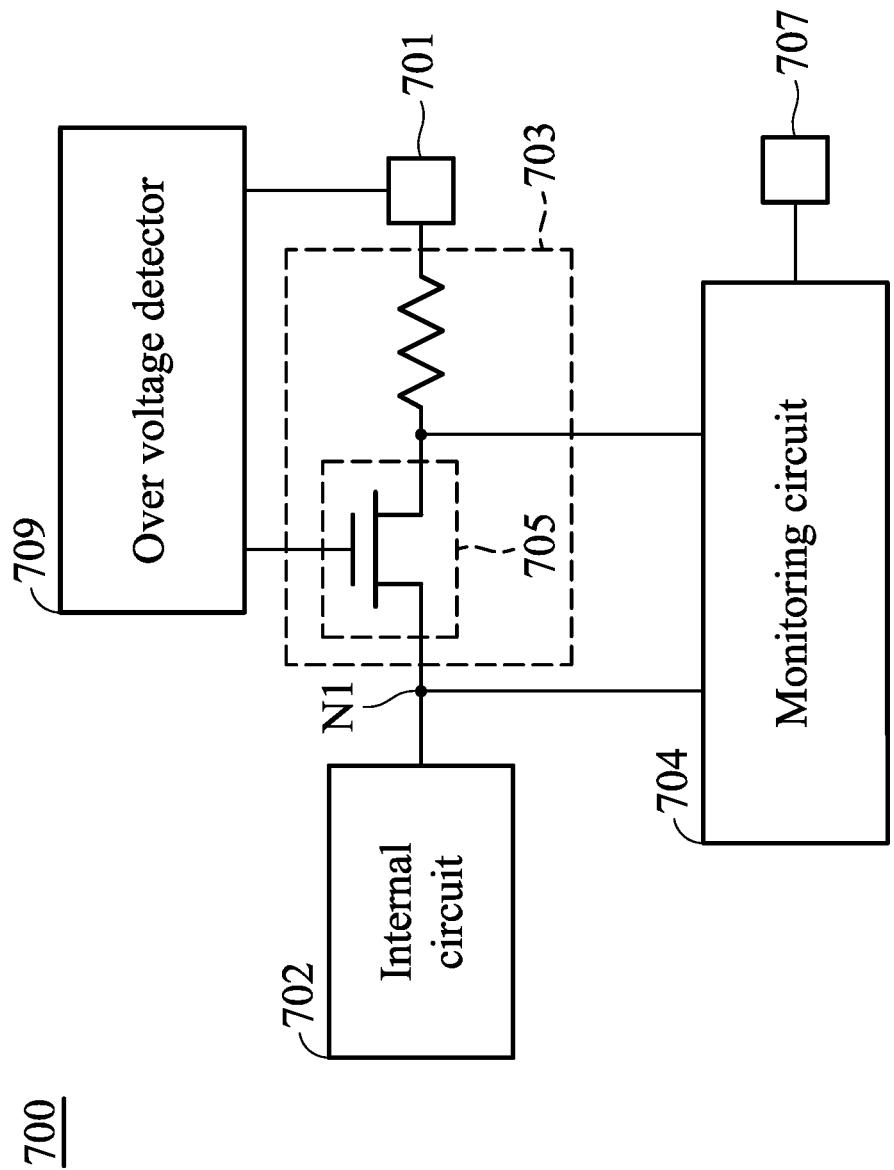
FIG. 7 shows an exemplary block diagram of an interface circuit of an electronic device according to an embodiment in a second aspect of the invention.

FIG. 7 shows an exemplary block diagram of an interface circuit of an electronic device according to an embodiment in a second aspect of the invention. The interface circuit 700 may comprise at least one pin 701 configured to be selectively connected to an external circuit, an internal circuit 702, an over-voltage protection circuit 703 and a monitoring circuit 704. The internal circuit 702 is configured to provide a main interfacing function of the interface circuit 700. The over-voltage protection circuit 703 is coupled between the internal circuit 702 and the pin 701, and is configured to control voltage at a predetermined node N1 to prevent the internal circuit 702 from being damaged by a voltage spike or a current surge received at the pin 701.

According to an embodiment of the invention, the over-voltage protection circuit 703 may comprise one or more transistors (or, in some embodiments, at least one resistor and one or more transistors). In this embodiment, the critical component is the transistor 705 coupled to the predetermined node N1, and the electrical characteristics of the critical component to be monitored by the monitoring circuit 404 is the turn-on resistance of the transistor 705.

When a transistor keeps suffering from high voltage, the turn-on resistance thereof will be increased, and the transistor may finally break down. In order to prevent the electronic device 700 and prevent the critical component from breaking down, the monitoring circuit 704 monitors the turn-on resistance of the transistor 705 and output a warning signal via the output pin 707 before the transistor 705 breaks down.

According to an embodiment of the invention, the monitoring circuit 704 may monitor the turn-on resistance of the transistor 705 by detecting the voltage at the predetermined node N1 or the voltage difference between two electrodes of the transistor 705, which is an important parameter or factor related to the turn-on resistance of the transistor 705. For example, the monitoring circuit 704 monitors the voltage at the predetermined node N1 or the voltage difference between two electrodes of the transistor 705 and compares the voltage or the voltage difference with a reference voltage to determine whether the voltage or the voltage difference is outside of a safety range. When the voltage or the voltage difference is determined outside of a safety range, the monitoring circuit 704 outputs a warning signal via the output pin 707. Note that the safety range may be flexibly designed according to the corresponding electrical characteristics to be monitored and may have a margin so that the critical component will not break down right after the voltage or the voltage difference is detected outside of the safety range.

According to an embodiment of the invention, the interface circuit 700 may further comprise an over-voltage detector 709. The over-voltage detector 709 is coupled to the pin 701 and the transistor 705 and is configured to detect the voltage level of the voltage spike received at the pin 701. When the over-voltage detector 709 detects that the voltage level exceeds a predetermined threshold, the over-voltage detector 709 may generate a corresponding control signal to turn off the transistor 705. Note that in some embodiments, the over-voltage detector 709 may also generate a corresponding control signal to slightly turn on the transistor 705. When the transistor 705 is turned off or slightly turned on, the internal circuit 702 is further protected.

Figure 8A:
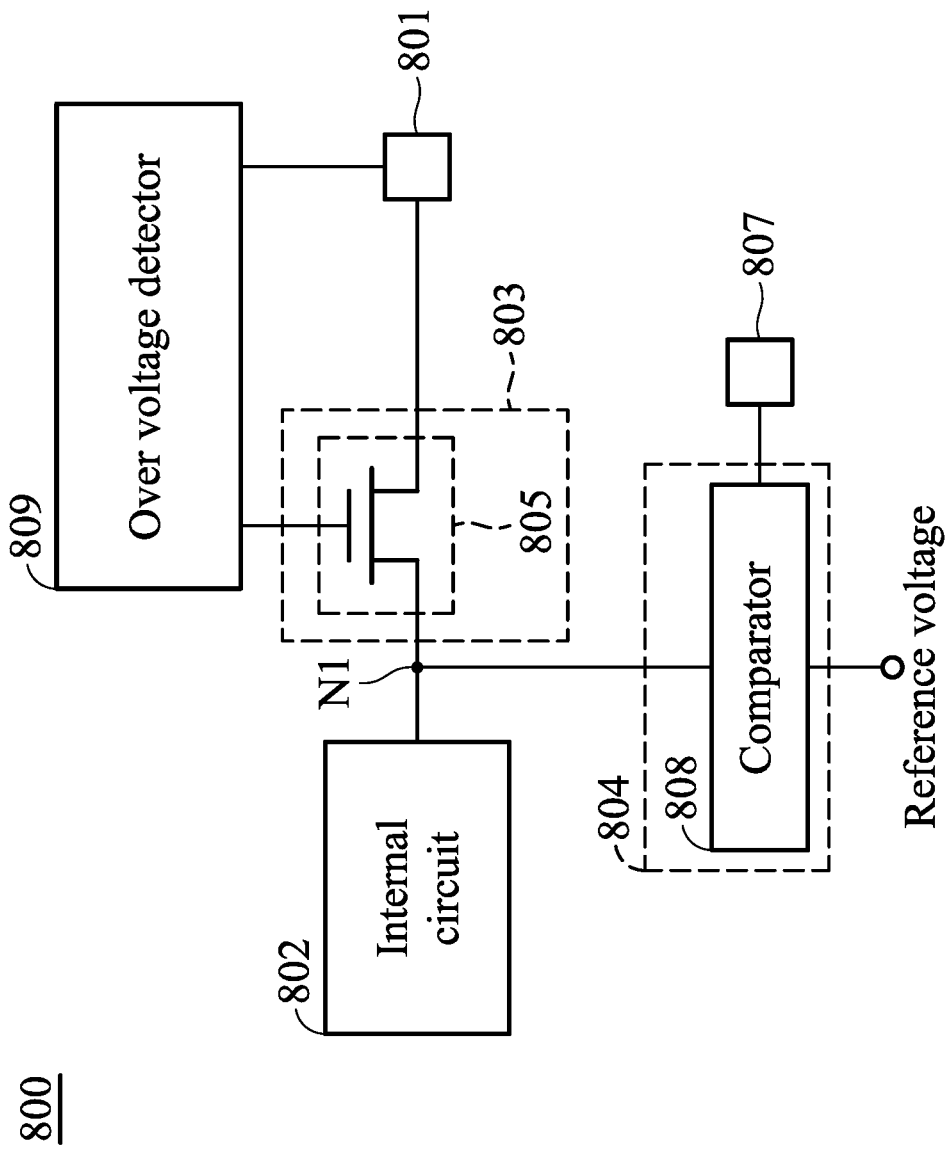
FIG. 8A shows an exemplary circuit diagram of an interface circuit of an electronic device according to a first embodiment in the second aspect of the invention.

FIG. 8A shows an exemplary circuit diagram of an interface circuit of an electronic device according to a first embodiment in the second aspect of the invention. The interface circuit 800 may comprise at least one pin 801 configured to be selectively connected to an external circuit, an internal circuit 802, an over-voltage protection circuit 803 comprising at least one transistor 805, a monitoring circuit 804 and an over-voltage detector 809. The internal circuit 802 is configured to provide a main interfacing function of the interface circuit 800. The over-voltage protection circuit 803 is coupled between the internal circuit 802 and the pin 801, and is configured to control voltage at a predetermined node N1 to prevent the internal circuit 802 from being damaged by a voltage spike or a current surge received at the pin 801. The over-voltage detector 809 is coupled to the pin 801 and the transistor 805 and is configured to detect the voltage level of the voltage spike received at the pin 801. When the over-voltage detector 809 detects that the voltage level exceeds a predetermined threshold, the over-voltage detector 809 may generate a corresponding control signal to turn off the transistor 805.

In this embodiment, the monitoring circuit 804 may comprise a comparator 808. The comparator 808 may have a first input terminal coupled to the predetermined node N1, a second input terminal receiving a reference voltage, and an output terminal coupled to the output pin 807. The comparator 808 compares the voltage at the predetermined node N1 with the reference voltage to determine whether the voltage is outside of a safety range. For example, when the voltage is lower than the reference voltage, the comparator 808 may output a logical high signal as a warning signal via the output pin 807 to warn the user.

Note that it is well known in the art that there are a variety of different designs for a comparator circuit. Therefore, the detailed circuit diagram of the comparator 808 is omitted here for brevity.

Note further that the comparator 808 may also designed to compare the voltage difference between two electrodes of the transistor 805 with the reference voltage to determine whether the voltage difference is outside of a safety range. For example, when the voltage is higher than the reference voltage, the comparator 808 may output a logical high signal as a warning signal via the output pin 807 to warn the user. The monitoring circuit 804 and the comparator 808 for comparing the voltage difference between two electrodes of the transistor 805 with the reference voltage may be implemented by the multi-function voltage detector 618 as shown in FIG. 6B and FIG. 6C accompanied by the processor of the electronic device as discussed above.

Figure 8B:
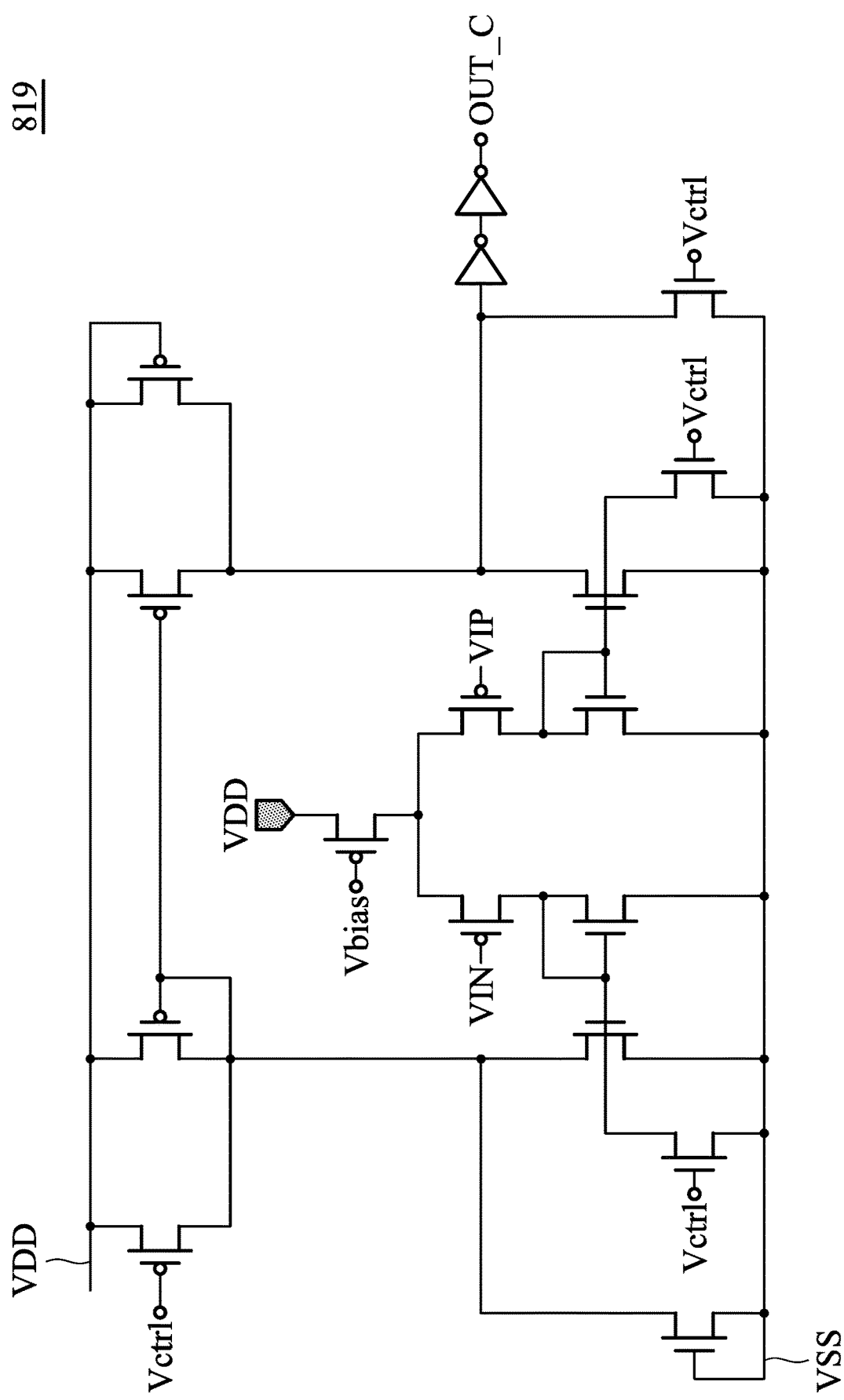
FIG. 8B shows an exemplary circuit diagram of an over-voltage detector circuit according to an embodiment of the invention.

FIG. 8B shows an exemplary circuit diagram of an over-voltage detector circuit according to an embodiment of the invention. The over-voltage detector 819 may comprise a first input terminal VIN receiving a reference signal Vref, a second input terminal VIP coupled to the I/O pin (e.g. the pin 801 shown in FIG. 8A), and an output terminal OUT_C outputting the corresponding control signal. For example, the output terminal OUT_C may be coupled to the control electrode of the transistor 805 and output a corresponding control signal to turn off the transistor 805 when detecting that the level of the voltage at the second input terminal VIP exceeds a predetermined threshold. The control voltages Vbias, Vctrl and the reference signal Vref may be provided by the processor (not shown) of the electronic device for adequately controlling the corresponding transistors.

Another exemplary circuit diagram for implementing an over-voltage detector circuit may refer to the multi-function voltage detector 618 as shown in FIG. 6B. As discussed above, the input terminal PAD is coupled to the I/O pin (e.g. the pin 801 as shown in FIG. 8B). When an over-voltage detecting function is required, the multi-function voltage detector 618 may act as an over-voltage detector. The multiplexer MUX may output the voltage received at the I/O pin to the input terminal of the comparator 620. The comparator 620 compares the multiplexer MUX output (that is, the voltage received at the I/O pin) with the DAC output and generates a comparison result. In this manner, the comparison result may be provided as a digital code. The processor (not shown) of the electronic device may further determine whether the level of the voltage received at the I/O pin exceeds a predetermined threshold according to the comparison result. When detecting that the level of the voltage received at the pin 801 exceeds a predetermined threshold, the processor may output a corresponding control signal to turn off the transistor 805.

Figure 9:
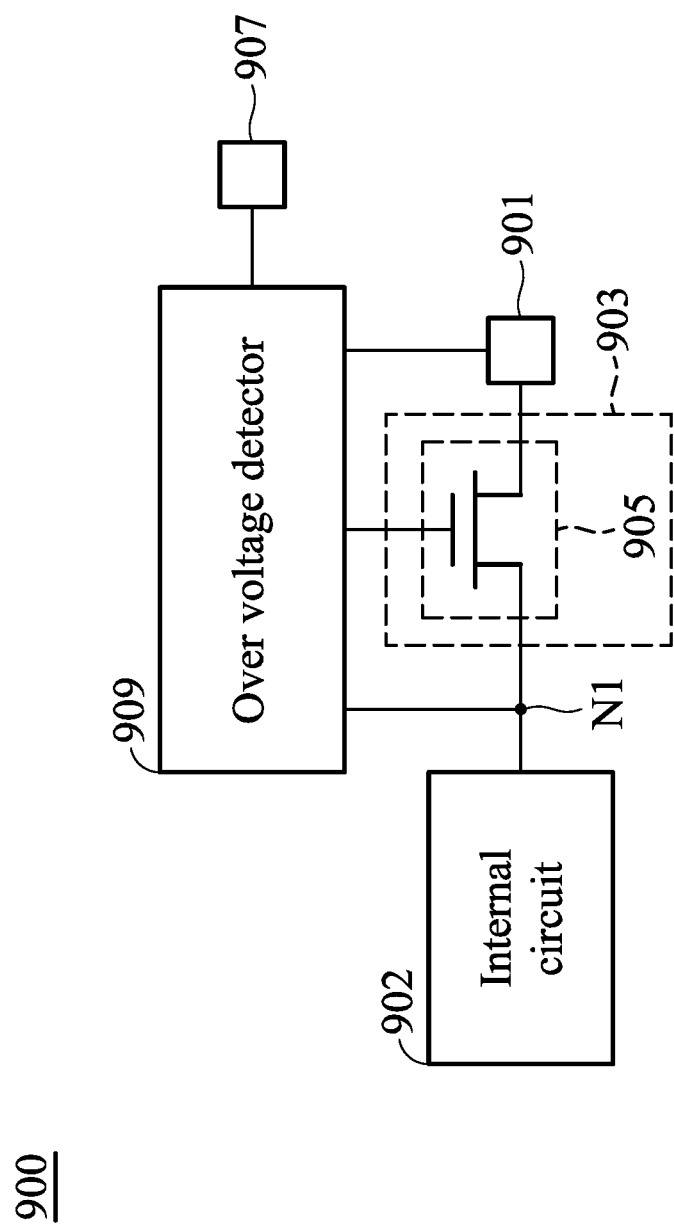
FIG. 9 shows an exemplary circuit diagram of an interface circuit of an electronic device according to a second embodiment in the second aspect of the invention.

FIG. 9 shows an exemplary circuit diagram of an interface circuit of an electronic device according to a second embodiment in the second aspect of the invention. The interface circuit 900 may comprise at least one pin 901 configured to be selectively connected to an external circuit, an internal circuit 902, an over-voltage protection circuit 903 and an over-voltage detector 909. In this embodiment, the monitoring circuit is integrated inside of the over-voltage detector 909.

The over-voltage detector 909 is coupled to the pin 901 and the transistor 905 and is configured to detect the voltage level of the voltage spike received at the pin 901. When the over-voltage detector 909 detects that the voltage level exceeds a predetermined threshold, the over-voltage detector 909 may generate a corresponding control signal to turn off the transistor 805.

The monitoring circuit compares the voltage at the predetermined node N1 with the reference voltage to determine whether the voltage is outside of a safety range. For example, when the voltage is lower than the reference voltage, the monitoring circuit may output a logical high signal as a warning signal via the output pin 907 to warn the user.

Note that it is well known in the art that there are a variety of different designs for a comparator circuit. Therefore, the detailed circuit diagram of an over-voltage detector with a monitoring circuit (e.g. a comparator) integrated therein may be derived from circuit diagram shown in FIG. 8B and is omitted here for brevity.

Figure 10:
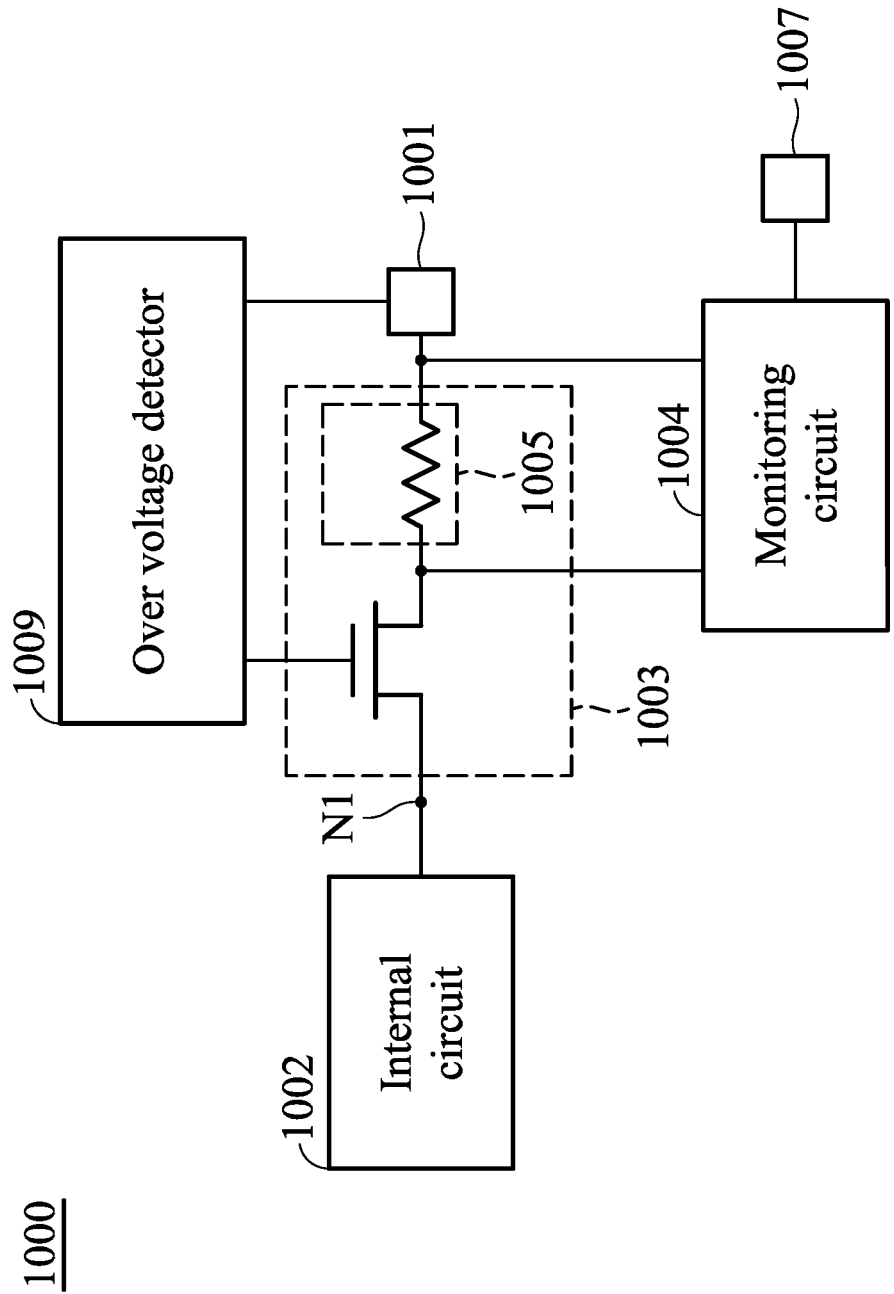
FIG. 10 shows an exemplary circuit diagram of an interface circuit of an electronic device according to a third embodiment in the second aspect of the invention.

FIG. 10 shows an exemplary circuit diagram of an interface circuit of an electronic device according to a third embodiment in the second aspect of the invention. The interface circuit 1000 may comprise at least one pin 1001 configured to be selectively connected to an external circuit, an internal circuit 1002, an over-voltage protection circuit 1003 comprising at least one transistor and at least one resistor 1005, a monitoring circuit 1004 and an over-voltage detector 1009.

In this embodiment, the critical component is the resistor 1005 and the monitoring circuit 1004 compares a voltage at one terminal of the resistor 1005 or the voltage difference between two terminals of the resistor 1005 with the reference voltage to determine whether the voltage or voltage difference is outside of a safety range. For example, when the voltage difference is higher than the reference voltage, the monitoring circuit 1004 may output a logical high signal as a warning signal via the output pin 1007 to warn the user.

Figure 11:
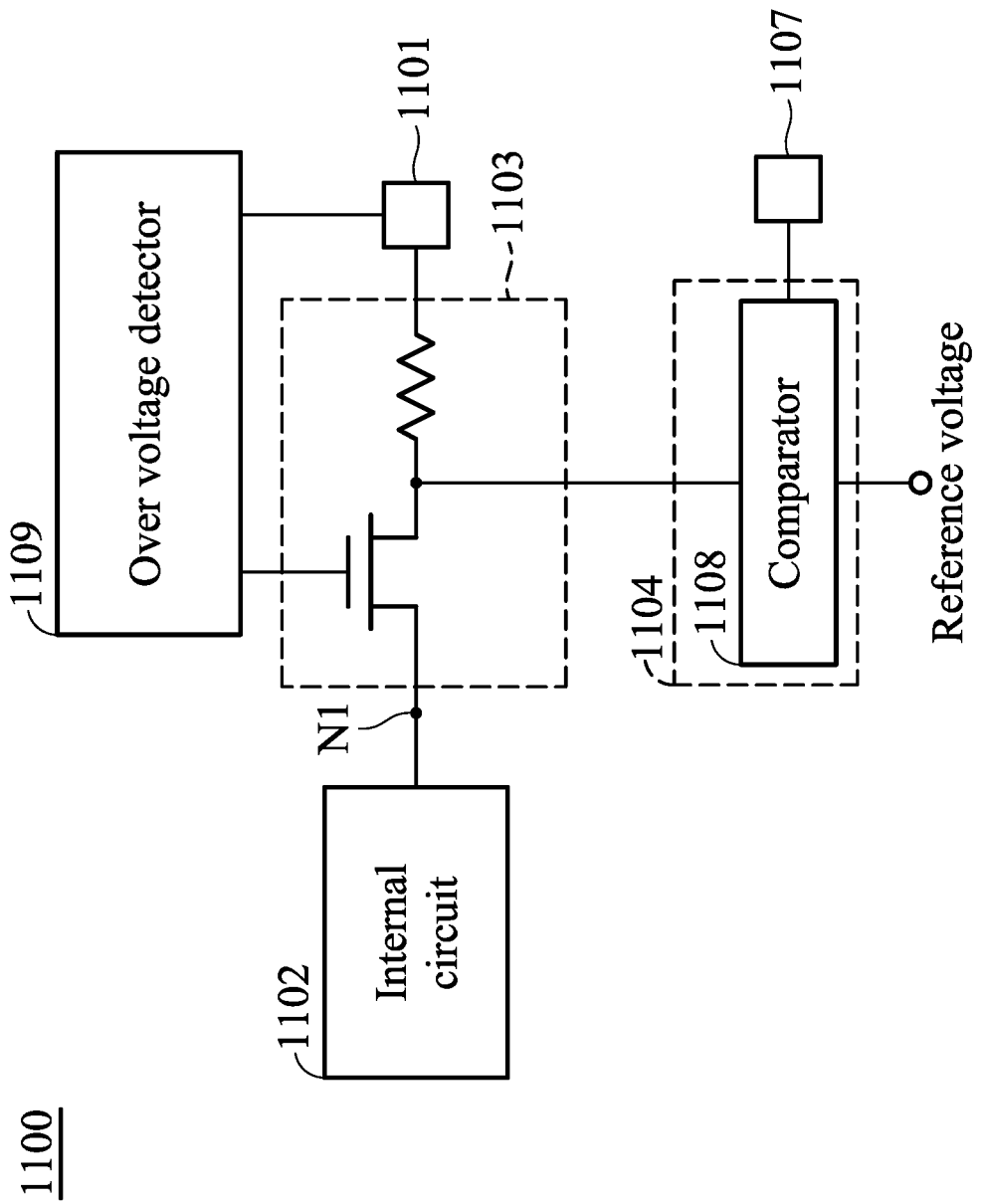
FIG. 11 shows an exemplary circuit diagram of an interface circuit of an electronic device according to a fourth embodiment in the second aspect of the invention.

FIG. 11 shows an exemplary circuit diagram of an interface circuit of an electronic device according to a fourth embodiment in the second aspect of the invention. The interface circuit 1100 may comprise at least one pin 1101 configured to be selectively connected to an external circuit, an internal circuit 1102, an over-voltage protection circuit 1103 comprising at least one transistor and at least one resistor, a monitoring circuit 1104 and an over-voltage detector 1109. An exemplary circuit diagram of the over-voltage detector 1109 may refer to FIG. 8B, and is omitted here for brevity.

In this embodiment, the critical component may be the resistor or the transistor comprised in the over-voltage protection circuit 1103, and the monitoring circuit 1104 may comprise a comparator 1108 to compare a voltage at one terminal or one node of the resistor or the transistor (for example, the predetermined node N1 or a connection node of the resistor and the transistor) with the reference voltage to determine whether the voltage is outside of a safety range. For example, when the voltage is lower than the reference voltage, the comparator 1108 may output a logical high signal as a warning signal via the output pin 1107 to warn the user.

Figure 12:
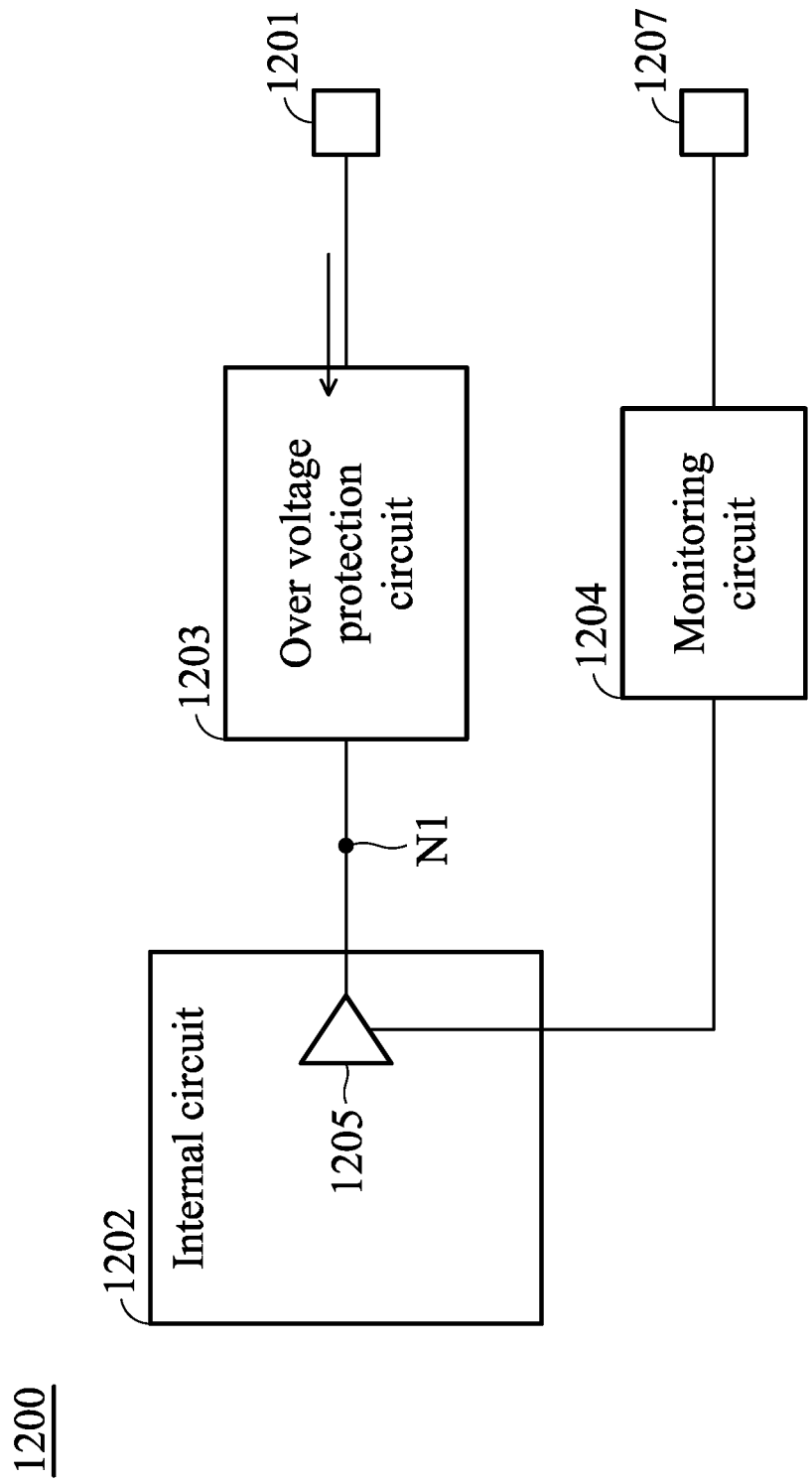
FIG. 12 shows an exemplary block diagram of an interface circuit of an electronic device according to an embodiment in a third aspect of the invention.

FIG. 12 shows an exemplary block diagram of an interface circuit of an electronic device according to an embodiment in a third aspect of the invention. The interface circuit 1200 may comprise at least one pin 1201 configured to be selectively connected to an external circuit, an internal circuit 1202, an over-voltage protection circuit 1203 and a monitoring circuit 1204.

In this embodiment, the internal circuit 1202 may comprise one or more input/output devices coupled to the predetermined node N1, and wherein the critical component is at least one I/O device 1205 in the internal circuit 1202. For example, the monitoring circuit 1204 monitors the voltage at the predetermined node N1 or a voltage difference between two terminals of the I/O device 1205 and compares the voltage or the voltage difference with a reference voltage to determine whether the voltage or the voltage difference is outside of a safety range. When the voltage or the voltage difference is determined outside of a safety range, the monitoring circuit 1204 outputs a warning signal via the output pin 1207. Note that the safety range may be flexibly designed according to the corresponding electrical characteristics to be monitored and may have a margin so that the critical component will not break down right after the voltage or the voltage difference is detected outside of the safety range.

Note further that in the third aspect of the invention, besides the critical component in the internal circuit 1202, the monitoring circuit 1204 may also monitor one or more critical components in the over-voltage protection circuit 1203 as the embodiments discussed above, and the invention should not be limited thereto.

Figure 13:
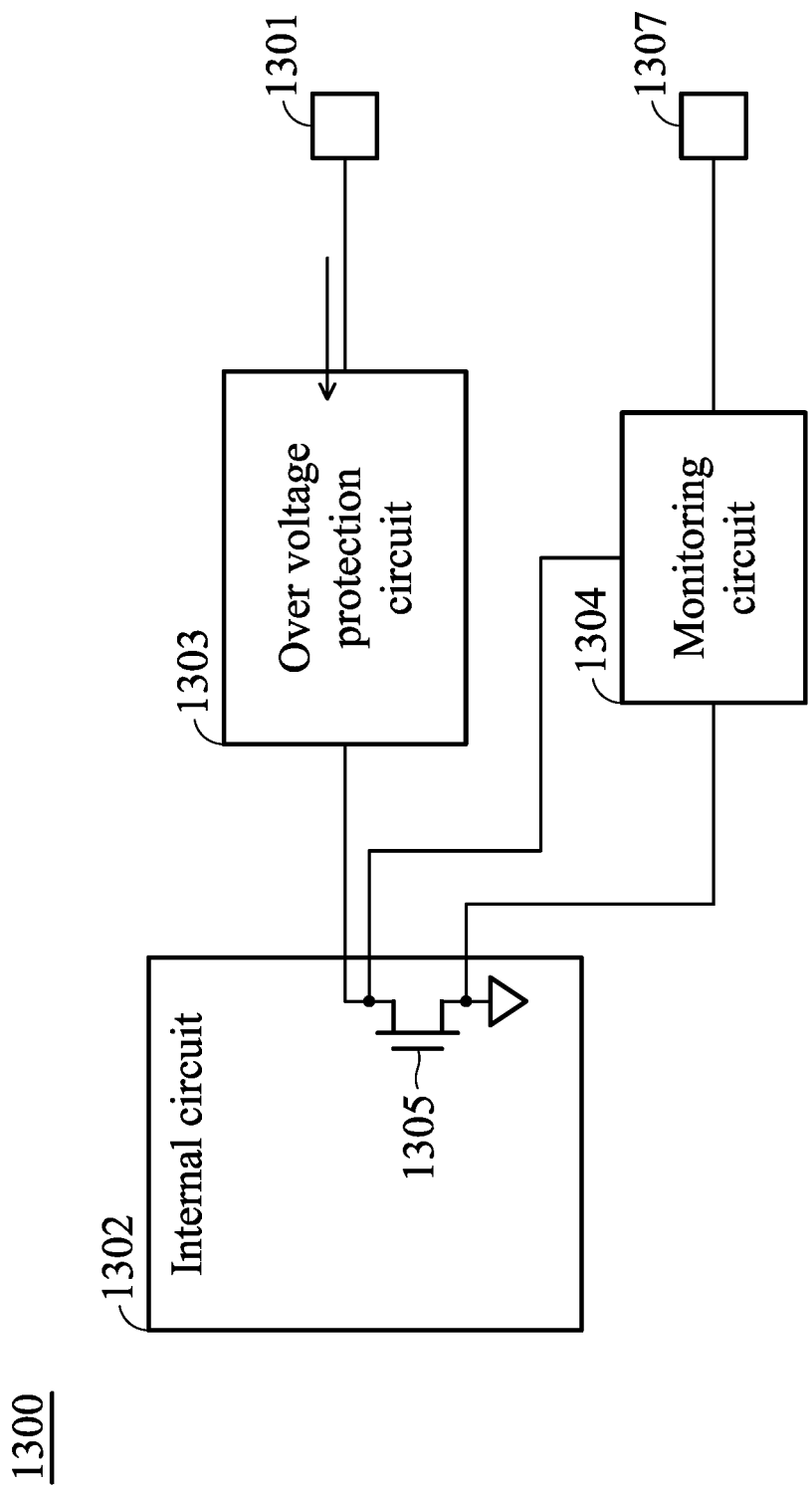
FIG. 13 shows an exemplary circuit diagram of an interface circuit of an electronic device according to an embodiment in the third aspect of the invention.

FIG. 13 shows an exemplary circuit diagram of an interface circuit of an electronic device according to an embodiment in the third aspect of the invention. The interface circuit 1300 may comprise at least one pin 1301 configured to be selectively connected to an external circuit, an internal circuit 1302, an over-voltage protection circuit 1303 and a monitoring circuit 1304.

In this embodiment, the monitoring circuit 1304 may monitor the voltage difference between two electrodes of the transistor 1305 in the internal circuit 1302 and compare voltage difference with a reference voltage to determine whether the voltage difference is outside of a safety range. For example, when the voltage difference is higher than the reference voltage, it is determined outside of a safety range and the monitoring circuit 704 outputs a warning signal via the output pin 1307. Note that the safety range may be flexibly designed according to the corresponding electrical characteristics to be monitored and may have a margin so that the critical component will not break down right after the voltage or the voltage difference is detected outside of the safety range.

Note further that in the third aspect of the invention, besides the critical component in the internal circuit 1302, the monitoring circuit 1304 may also monitor one or more critical components in the over-voltage protection circuit 1303 as the embodiments discussed above, and the invention should not be limited thereto.

As the embodiment described above, with the over-voltage protection circuit, the voltage at the predetermined node N1 may be controlled to adequately fall within a predetermined range, so as to prevent the internal circuit from being damaged by an extreme high voltage received at the I/O pin. In addition, with the monitoring circuit may, a further protection on the critical components in the interface circuit 300 may also be provided to generate a warning signal when the critical component is about to break down. In addition, in some embodiments, with an over-voltage detector, the transistor in the over-voltage protection circuit may be turned off or slightly turned on when required, and the internal circuit can be further protected.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An interface circuit of an electronic device, comprising:
one or more pins, configured to be selectively connected to an external circuit; an internal circuit;
an over-voltage protection circuit, coupled between the internal circuit and at least one pin to prevent the internal circuit from being damaged by a voltage spike or a current surge received at the pin; and
a monitoring circuit, configured to monitor one or more electrical characteristics of at least one critical component in the internal circuit and the over-voltage protection circuit by monitoring a value of at least one parameter of the electrical characteristics of the critical component,
wherein when the value of the parameter is outside of a safety range, the monitoring circuit outputs a warning signal.

2. The interface circuit as claimed in claim 1, wherein the over-voltage protection circuit comprises one or more resistors coupled to a predetermined node, and the critical component is at least one resistor in the over-voltage protection circuit.

3. The interface circuit as claimed in claim 2, wherein the monitoring circuit monitors the voltage at the predetermined node or a voltage difference between two terminals of the resistor and compares the voltage or the voltage difference with a reference voltage to determine whether the voltage or the voltage difference is outside of a safety range.

4. The interface circuit as claimed in claim 1, wherein the over-voltage protection circuit comprises one or more diodes coupled to a predetermined node, and the critical component is at least one diode in the over-voltage protection circuit.

5. The interface circuit as claimed in claim 4, wherein the monitoring circuit monitors a voltage difference between two terminals of the diode and compares the voltage difference with a reference voltage to determine whether the voltage difference is outside of a safety range.

6. The interface circuit as claimed in claim 1, wherein the over-voltage protection circuit comprises one or more transistors coupled to a predetermined node, and the critical component is at least one transistor in the over-voltage protection circuit.

7. The interface circuit as claimed in claim 6, wherein the monitoring circuit monitors a voltage difference between two electrodes of the transistor and compares the voltage difference with a reference voltage to determine whether the voltage difference is outside of a safety range.

8. The interface circuit as claimed in claim 6, further comprising:
an over-voltage detector, coupled to the pin and the transistor and configured to detect a voltage level of the voltage spike received at the pin,
wherein when the over-voltage detector detects that the voltage level exceeds a predetermined threshold, the over-voltage detector turns off the transistor.

9. The interface circuit as claimed in claim 1, wherein the internal circuit comprises one or more input/output devices coupled to a predetermined node, and wherein the critical component is at least one input/output device in the internal circuit.

10. The interface circuit as claimed in claim 9, wherein the monitoring circuit monitors a voltage difference between two terminals of the input/output device and compares the voltage difference with a reference voltage to determine whether the voltage difference is outside of a safety range.

11. An interface circuit of an electronic device, comprising:
one or more pins, configured to be selectively connected to an external circuit; an internal circuit;
an over-voltage protection circuit, coupled between the internal circuit and at least one pin to prevent the internal circuit from being damaged by a voltage spike or a current surge received at the pin; and
a monitoring circuit, configured to monitor one or more electrical characteristics of at least one critical component in the over-voltage protection circuit by monitoring a value of at least one parameter of the electrical characteristics of the critical component,
wherein when the value of the parameter is outside of a safety range, the monitoring circuit outputs a warning signal.

12. The interface circuit as claimed in claim 11, wherein the over-voltage protection circuit comprises one or more resistors coupled to a predetermined node, the critical component is at least one resistor in the over-voltage protection circuit, and the electrical characteristics of the critical component is a resistance of the resistor.

13. The interface circuit as claimed in claim 12, wherein the monitoring circuit monitors the voltage at the predetermined node or a voltage difference between two terminals of the resistor and compares the voltage or the voltage difference with a reference voltage to determine whether the voltage or the voltage difference is outside of a safety range.

14. The interface circuit as claimed in claim 11, wherein the over-voltage protection circuit comprises one or more diodes coupled to a predetermined node, the critical component is at least one diode in the over-voltage protection circuit, and the electrical characteristics of the critical component is a cross-terminal voltage of the diode.

15. The interface circuit as claimed in claim 14, wherein the monitoring circuit monitors the voltage difference between two terminals of the diode and compares the voltage difference with a reference voltage to determine whether the voltage difference is outside of a safety range.

16. The interface circuit as claimed in claim 11, wherein the over-voltage protection circuit comprises one or more transistors coupled to a predetermined node, the critical component is at least one transistor in the over-voltage protection circuit, and the electrical characteristics of the critical component is turn-on resistance of the transistor.

17. The interface circuit as claimed in claim 16, wherein the monitoring circuit monitors the voltage difference between two electrodes of the transistor and compares the voltage difference with a reference voltage to determine whether the voltage difference is outside of a safety range.

18. The interface circuit as claimed in claim 16, further comprising:
an over-voltage detector, coupled to the pin and the transistor and configured to detect the voltage level of the voltage spike received at the pin,
wherein when the over-voltage detector detects that the voltage level exceeds a predetermined threshold, the over-voltage detector turns off the transistor.

19. The interface circuit as claimed in claim 11, wherein the internal circuit comprises one or more input/output devices coupled to a predetermined node, and wherein the monitoring circuit further monitors one or more electrical characteristics of at least one input/output device.

20. The interface circuit as claimed in claim 19, wherein the monitoring circuit compares a voltage difference between two terminals of the input/output device with a reference voltage to determine whether the voltage difference is outside of a safety range, and when the voltage difference is outside of a safety range, the monitoring circuit outputs the warning signal.

21. An interface circuit of an electronic device, comprising:
one or more pins, configured to be selectively connected to an external circuit;
an internal circuit;
an over-voltage protection circuit, coupled between the internal circuit and at least one pin to prevent the internal circuit from being damaged by a voltage spike or a current surge received at the pin; and
a monitoring circuit, configured to monitor one or more electrical characteristics of at least one critical component in the internal circuit and the over-voltage protection circuit by monitoring a value of at least one parameter of the electrical characteristics of the critical component,
wherein when the value of the parameter is outside of a safety range, the monitoring circuit outputs a warning signal, and wherein the over-voltage protection circuit comprises one or more resistors coupled between a predetermined node and the at least one pin.

22. The interface circuit as claimed in claim 21, wherein the critical component is at least one resistor in the over-voltage protection circuit, and the monitoring circuit monitors the voltage at the predetermined node or a voltage difference between two terminals of the resistor and compares the voltage or the voltage difference with a reference voltage to determine whether the voltage or the voltage difference is outside of a safety range.

23. The interface circuit as claimed in claim 21, wherein the over-voltage protection circuit further comprises one or more diodes coupled to the predetermined node, and the critical component is at least one diode in the over-voltage protection circuit.

24. The interface circuit as claimed in claim 21, wherein the monitoring circuit monitors a voltage difference between two terminals of the diode and compares the voltage difference with a reference voltage to determine whether the voltage difference is outside of a safety range.

* * * * *